Figure 5:
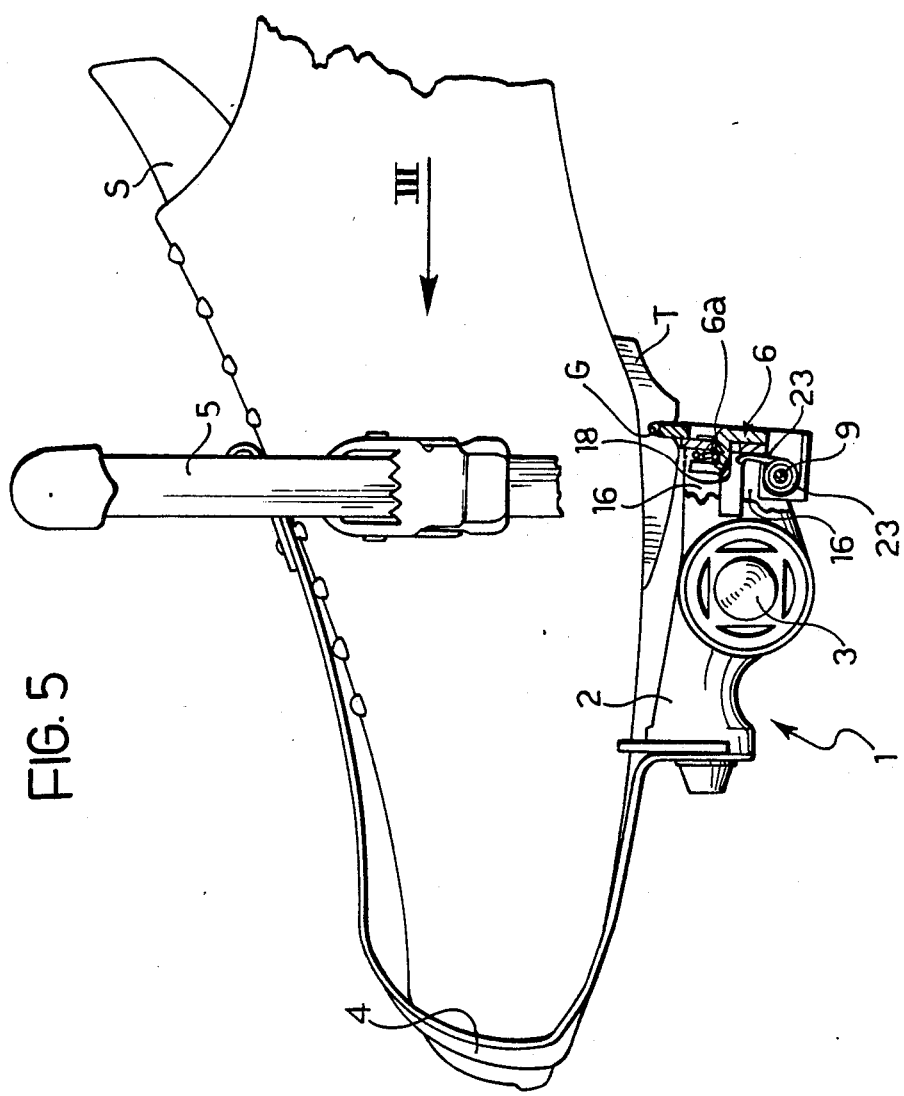

United States Patent [19]

Romano

[11] Patent Number: 4,898,064
[45] Date of Patent: Feb. 6, 1990

[54] PEDAL WITH A SAFETY DEVICE, FOR RACE-BICYCLES

[75] Inventor: Antonio Romano, Padua, Italy
[73] Assignee: Campagnolo S.p.A., Vicenza, Italy
[21] Appl. No.: 270,592
[22] Filed: Nov. 14, 1988

[30] Foreign Application Priority Data

Nov. 12, 1987 [IT] Italy .............................. 67965 A/87
Aug. 1, 1988 [IT] Italy .............................. 67728 A/88
Sep. 22, 1988 [IT] Italy .............................. 67842 A/88

[51] Int. Cl.⁴ .......................................... G05G 1/14
[52] U.S. Cl. .................................. 74/594.6; 74/594.4; 36/131
[58] Field of Search .................. 74/594.6, 594.7, 594.4, 74/560; 36/131, 132

[56] References Cited

U.S. PATENT DOCUMENTS

| 4,089,236 | 5/1978 | Genzling | 74/560 |
| 4,547,983 | 10/1985 | Brandt | 36/131 |
| 4,646,586 | 3/1987 | Rapisarda | 74/594.6 |
| 4,686,867 | 8/1987 | Bernard | 74/594.4 |
| 4,762,019 | 8/1988 | Beyl | 74/594.6 |

FOREIGN PATENT DOCUMENTS

| 3221429 | 12/1983 | Fed. Rep. of Germany | 74/594.6 |
| 3306925 | 4/1984 | Fed. Rep. of Germany | 74/594.6 |
| 3722192 | 1/1988 | Fed. Rep. of Germany | 36/131 |
| 664795 | 9/1929 | France | 74/594.4 |
| 2553370 | 4/1985 | France | 74/594.6 |

Primary Examiner—Gary L. Smith
Assistant Examiner—F. Saether
Attorney, Agent, or Firm—Sughrue, Mion, Zinn, Macpeak & Seas

[57] ABSTRACT

A pedal for racing bicycle comprises a pedal body carrying a toe clip at the front with a strap for retaining a cycling shoe and a transverse stop at the rear which is adapted to engage a recess formed in a cleat fitted to the sole of the shoe. The transverse stop is movable relative to the body of the pedal so as to enable the cleat to be released in use as a result of a backward and/or rotary force applied by the shoe above a threshold value.

10 Claims, 12 Drawing Sheets

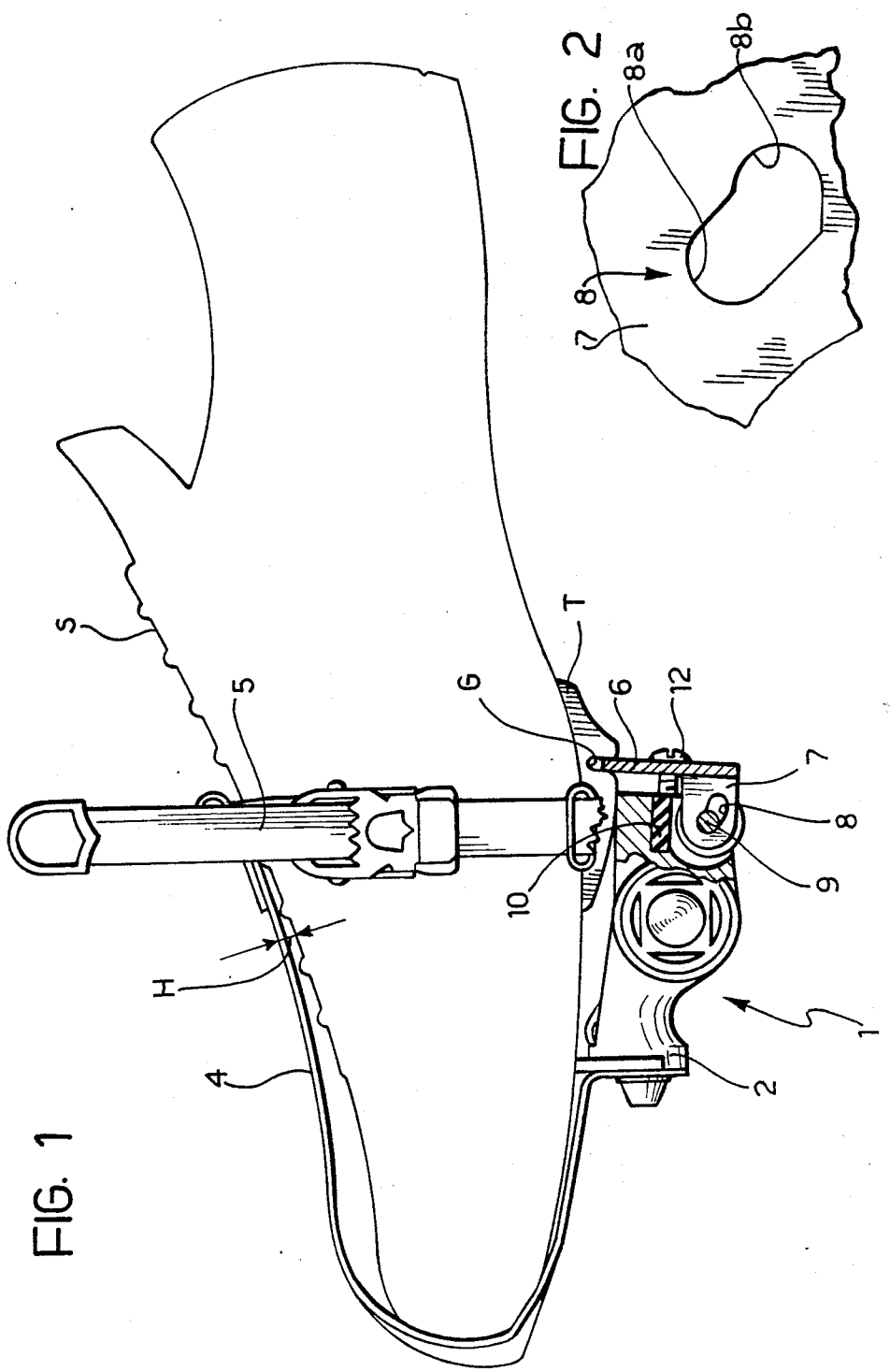

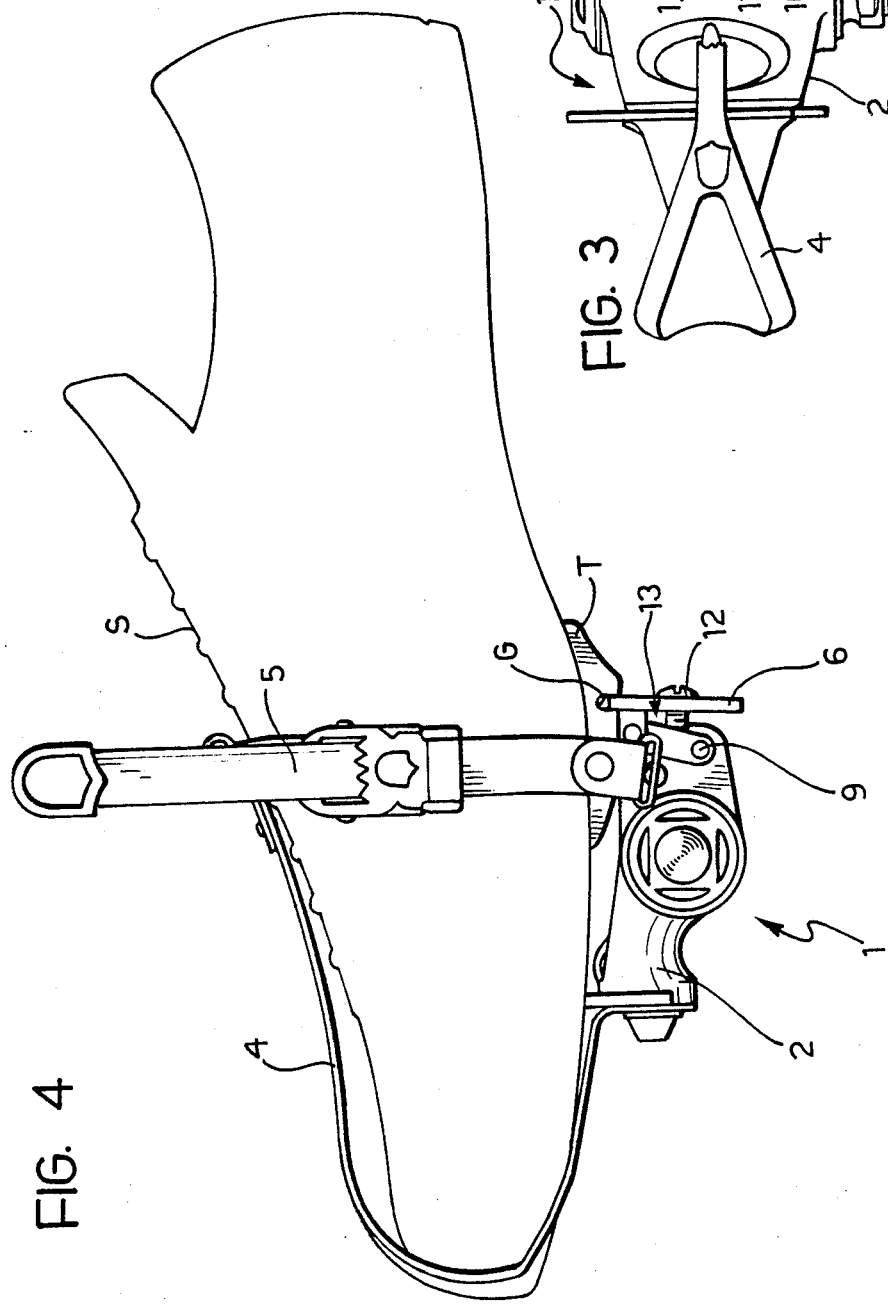

PEDAL WITH A SAFETY DEVICE, FOR RACE-BICYCLES

The present invention relates to racing-bicycle pedals of the type comprising a pedal body carrying a toe clip with a strap for retaining a cycling shoe at the front and a transverse stop in the form of a projecting plate at the rear for engagement in a recess formed in a cleat fitted to the sole of the cycling shoe.

In pedals of this type, the system constituted by the toe clip with the strap and the transverse stop attaches the shoe firmly to the pedal enabling the cyclist to achieve maximum pedalling efficiency since the feeling that his foot may come off pedal is eliminated.

However, against this advantage must be set the risks of dangerous consequences in the event of a fall since the system described above does not allow the cyclist to detach himself sufficiently quickly from the bicycle.

For this reason, solutions of so-called rapid-release or safety pedals of greater or lesser effectiveness have recently been proposed which enable the cyclist to release his shoes rapidly from the pedals if need be.

Almost all these systems operate to a greater or lesser extent like the safety systems already produced for ski bindings.

In practice, although such systems are widely used at present, they have considerable disadvantages. In effect, whilst for skiing the boot grips the foot and ankle up to the calf, and the foot-boot system therefore constitutes an almost rigid assembly, the shoes conventionally used in cycling allow the foot a certain mobility within them so that the foot-shoe combination lacks rigidity. Moreover, these new pedals allow the shoe a certain freedom of movement relative to the pedal before this movement is opposed by the release mechanism.

For the reasons explained above, with the adoption of rapid-release or safety pedals, the cyclist's foot can move to a certain extent relative to the pedal so that the athlete loses the feeling of safety which was ensured during normal pedalling by conventional pedals with toe-clips and straps.

In short a clamping system of the ski-binding type does not, therefore, enable the athlete to perform at his best and to develop the maximum pedalling efficiency.

The object of the present invention is to avoid the above problems and to produce a bicycle pedal of the type defined above, that is with a toe-clip and a strap, which enables the advantages of quick-release or safety pedals to be achieved without the negative repercussions typical thereof.

According to the invention, this object is achieved by virtue of the fact that the rear transverse stop of the pedal is movable relative to the body of the pedal so as to enable its release from the shoe cleat in use as a result of a force applied by the shoe itself above a threshold value. The transverse stop is preferably supported by the body of the pedal so that it is movable between a forward, raised, retaining position and a retracted, lowered position for release from the shoe cleat, resilient biasing means being provided for keeping the transverse member in the retaining position.

Means are conveniently provided for adjusting the reaction force of the resilient biasing means.

According to another embodiment of the invention, the body of the pedal has an abutment which is resiliently snap-engageable by a corresponding retaining portion of the transverse member to keep the recess of the cleat engaged with the transverse member.

By virtue of these characteristics, it is not necessary to use very stiff resilient biasing to keep the transverse member in the retaining position and it suffices, for example, to use a light pin spring which has one arm adapted to snap-engage in the retaining portion of the transverse member, constituted, for example by a straight groove.

According to a further embodiment, the transverse member is connected to the body of the pedal with the interposition of an intermediate element which is articulated to the body about a main axis substantially parallel to the transverse member, the latter being able to pivot relative to the intermediate element about an auxiliary axis substantially perpendicular to the main axis so as to allow the transverse member to be released from the cleat, in use, as a result of a predetermined rotational force applied by the shoe about a substantially vertical axis and a subsequent backwards movement of the shoe itself.

By virtue of these characteristics, in order to release his foot from the pedal, the user first pivots his foot so as to move his heel away from the bicycle and then moves the shoe backwards, causing its release from the transverse member. Resilient means can therefore be used to advantage, to oppose only the pivoting of the transverse member about the vertical axis, the subsequent pivoting of the transverse member about the horizontal axis being possible without any force, enhancing the rapid release of the safety device.

Figure 6:
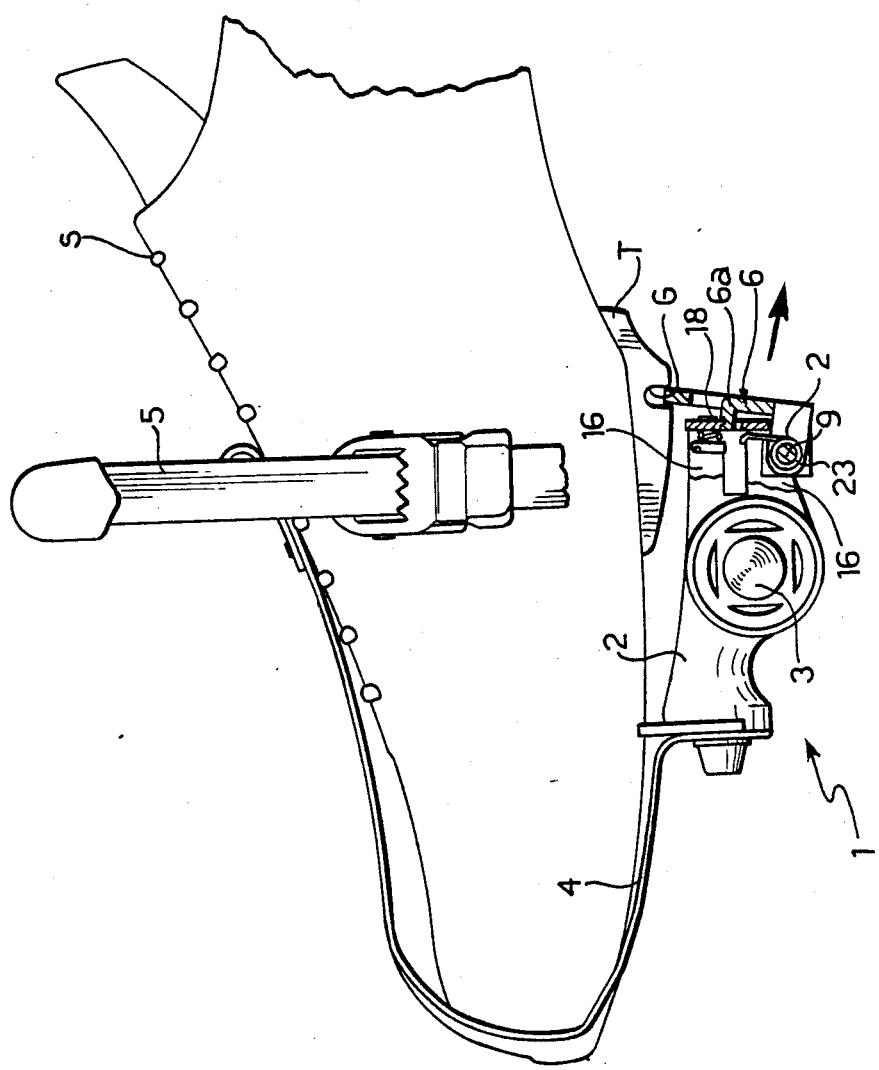
Figure 7:
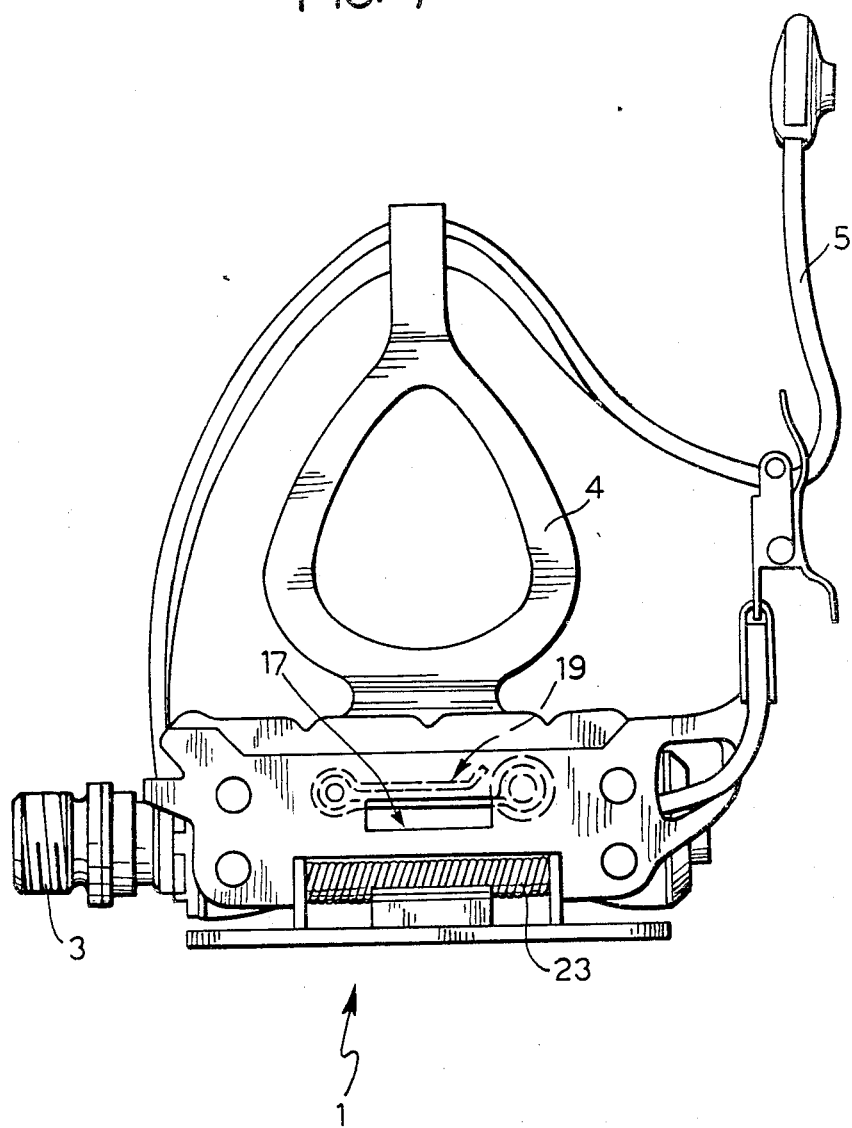
Figure 8:
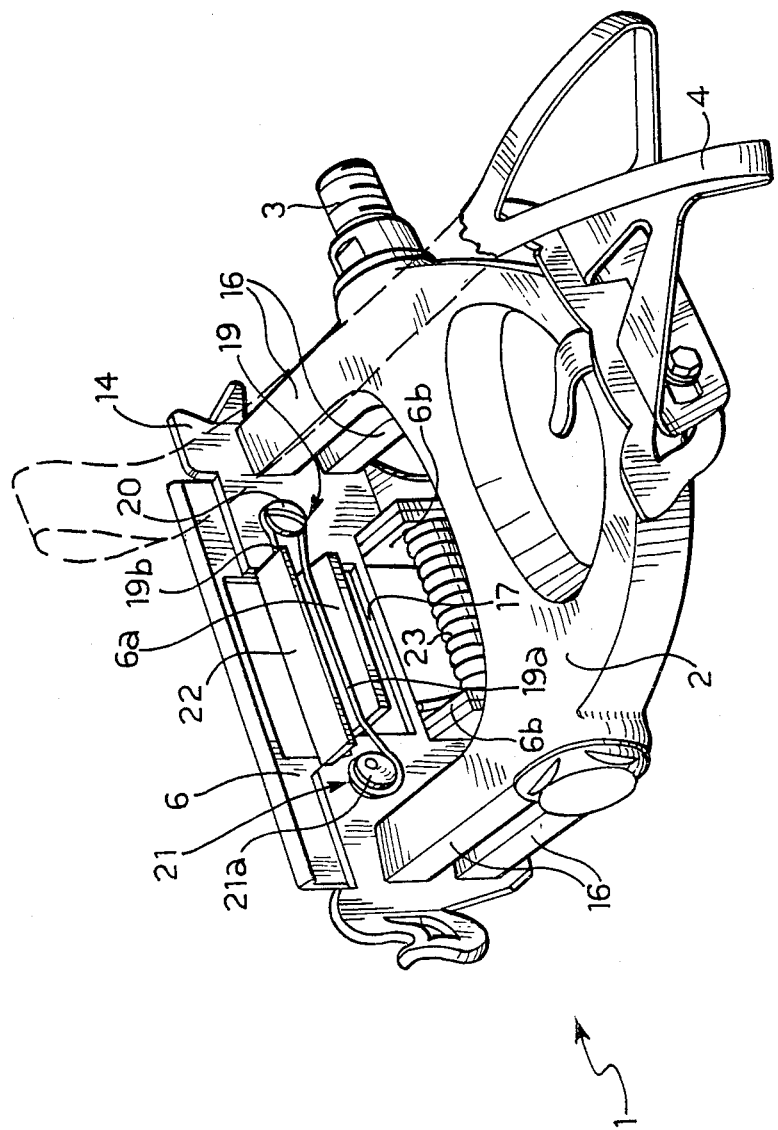
Figure 9:
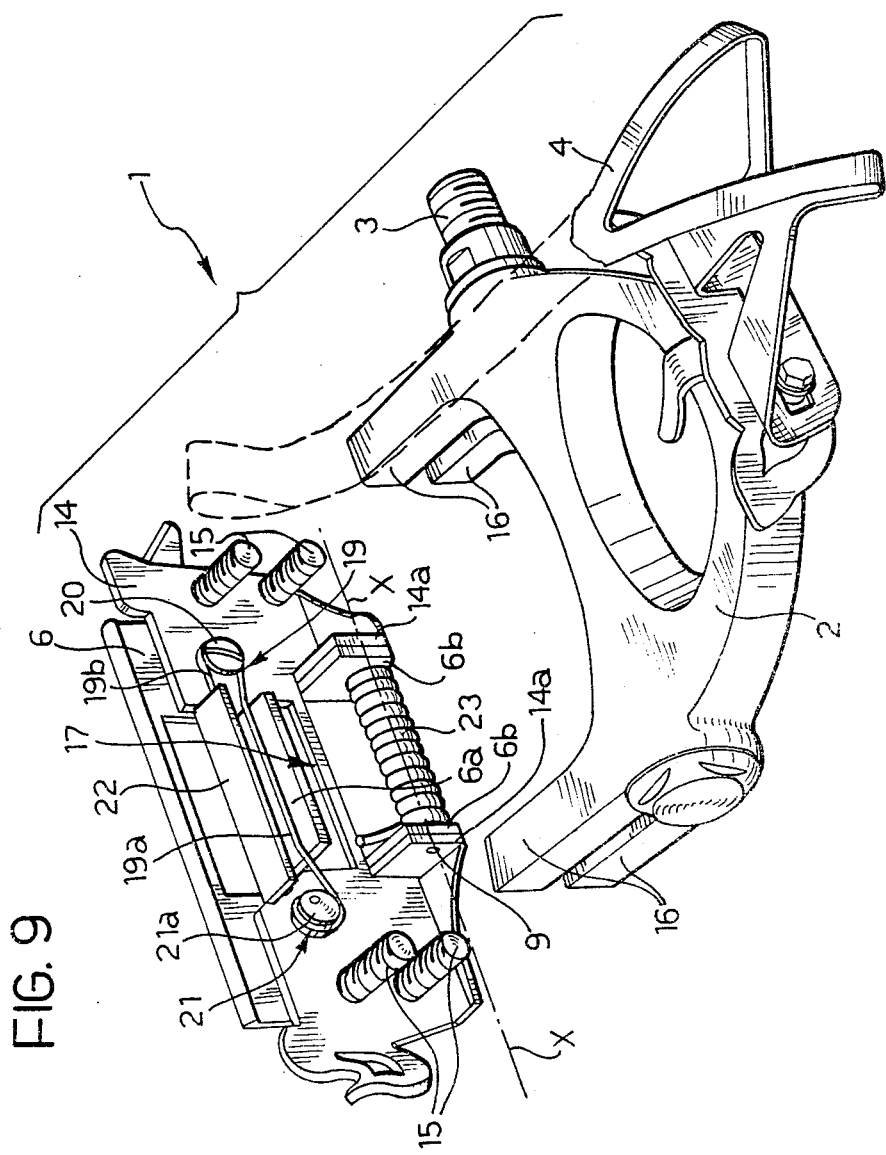
Figure 10:
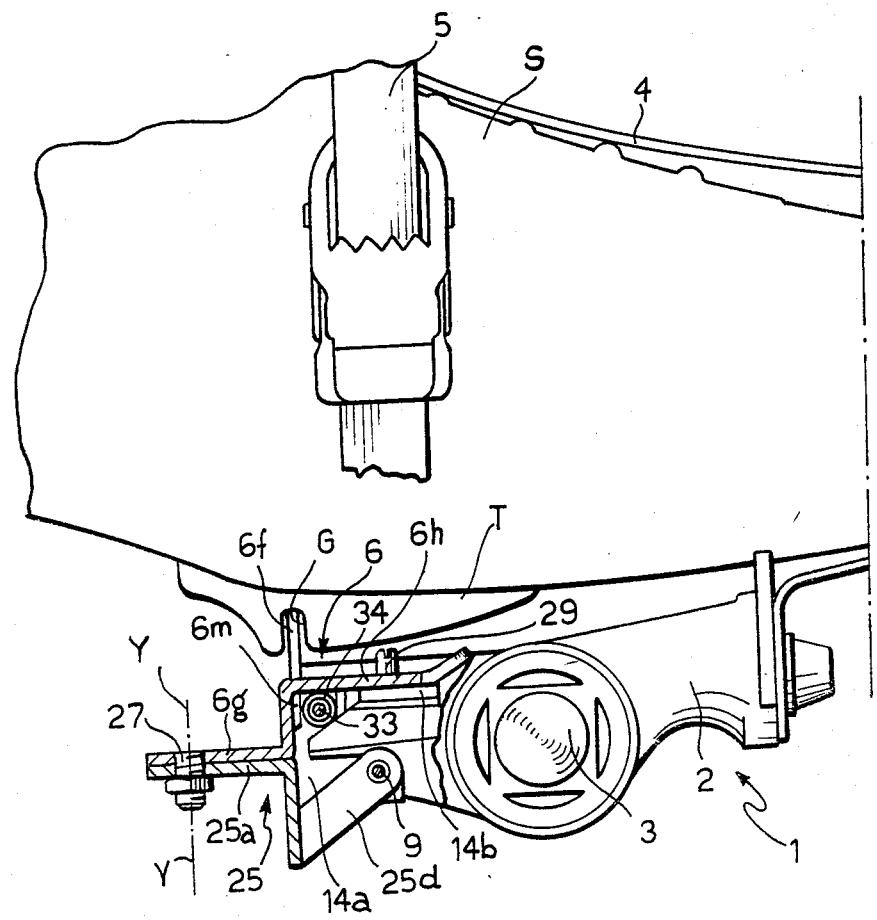
Figure 11:
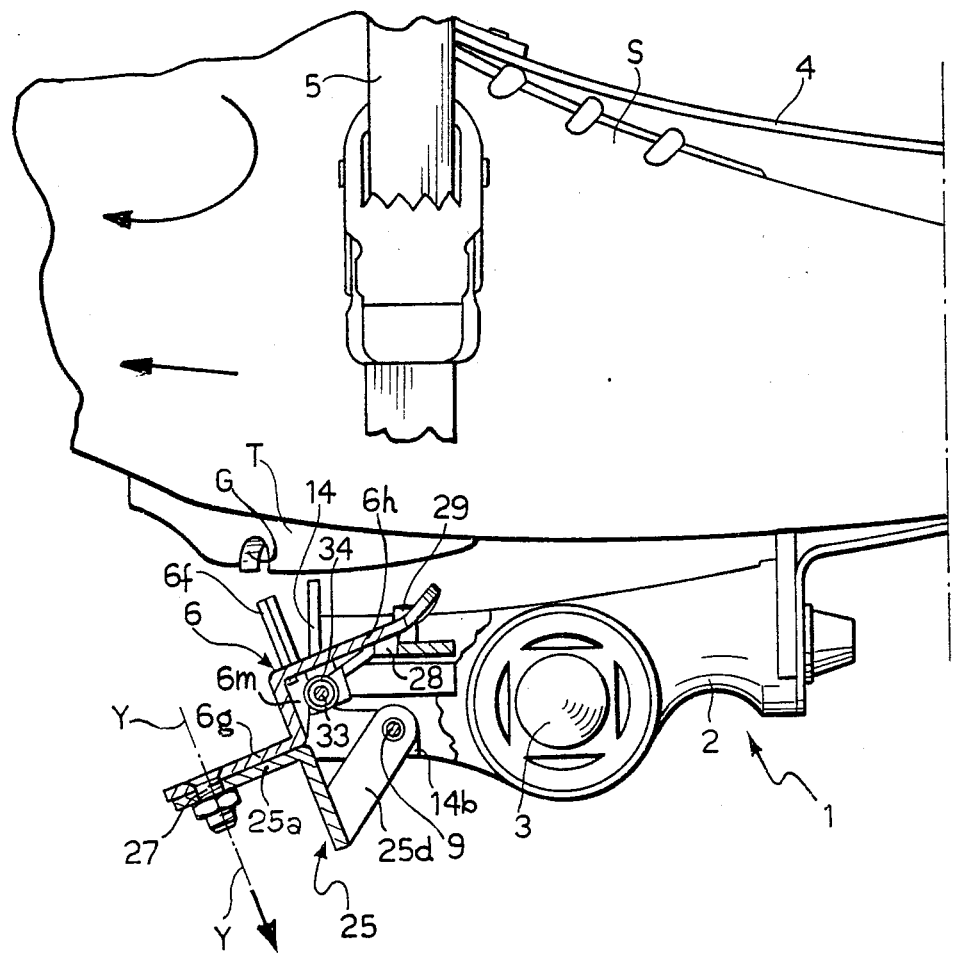
Figure 12:
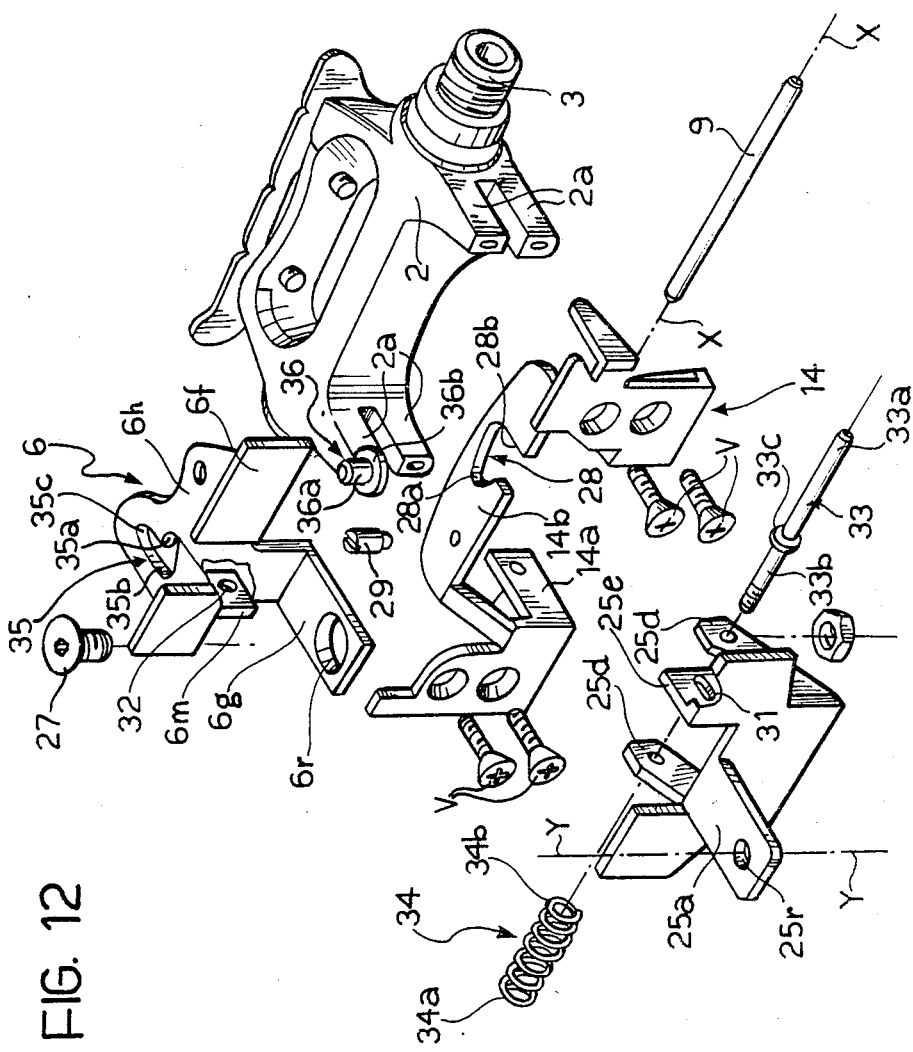
Figure 13:
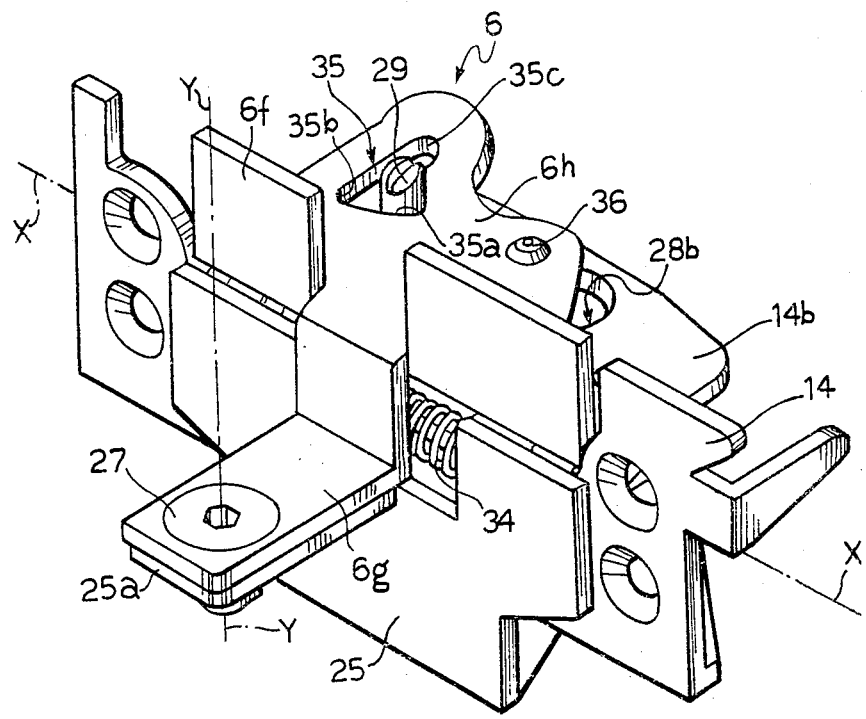
Figure 14:
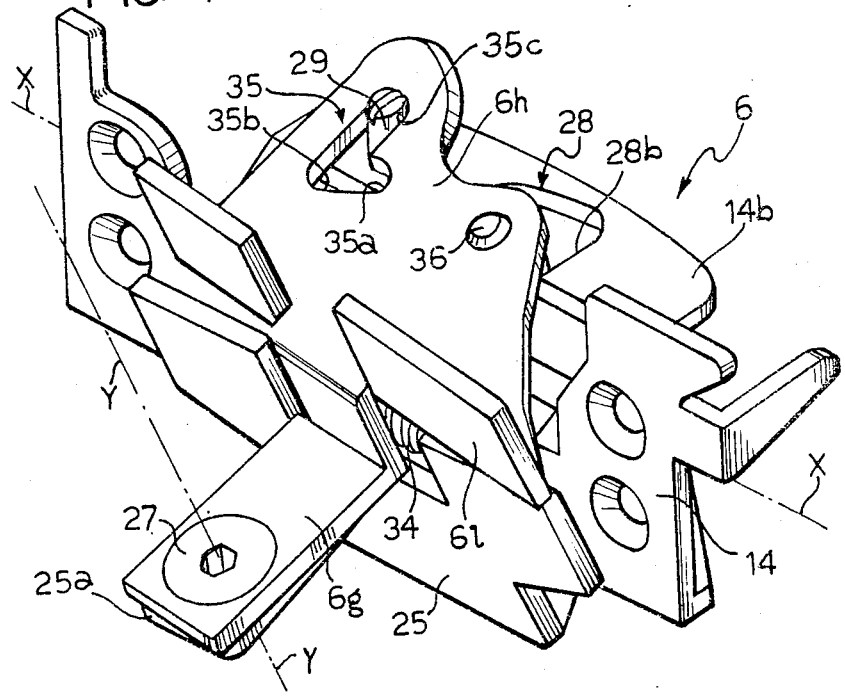
Figure 15:
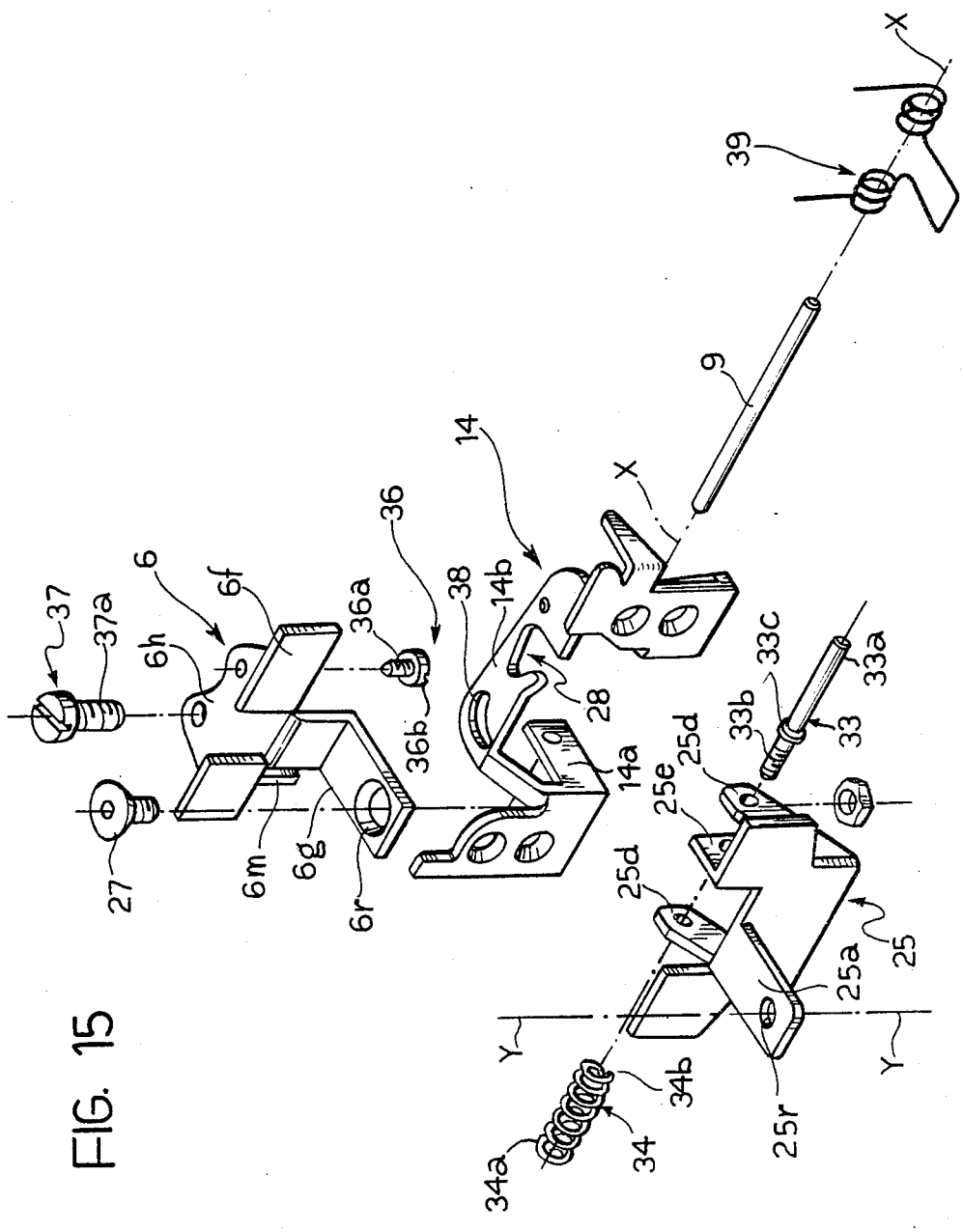

Further characteristics and advantages of the present invention will become clear from the detailed description which follows with reference to the appended drawings, provided by way of non-limiting exam which:

FIG. 1 is a partially-sectioned schematic side elevation of a bicycle pedal according to a first embodiment of the invention, FIG. 2 is an enlarged view of a detail of FIG. 1, FIG. 3 is a plan view of the pedal from above, FIG. 4 is a view similar to FIG. 1, of a second embodiment of the invention, FIG. 5 is a partially-sectioned schematic side elevation of a bicycle pedal according to a third embodiment of the invention in an operative configuration, FIG. 6 is a view similar to FIG. 5 showing the pedal in a configuration for the safety-release of the shoe from the pedal, FIG. 7 is a view taken on the arrow III of FIG. 5, FIG. 8 is a perspective view of the pedal of FIG. 5, FIG. 9 is a partially-exploded view of the pedal of FIG. 8, FIG. 10 is a partially-sectioned schematic side elevation of a bicycle pedal according to a fourth embodiment of the invention in an operative configuration, FIG. 11 is a view similar to FIG. 10 showing the pedal in a configuration for the safety-release of the shoe from the pedal, FIG. 12 is an exploded perspective view of the pedal of FIGS. 10 and 11, FIG. 13 is a perspective view of a portion of the pedal of FIG. 12 in an operative configuration, FIG. 14 is a perspective view similar to FIG. 13 showing a portion of the pedal in a configuration in which the shoe is released from the pedal, and FIG. 15 is an exploded partial-perspective view of a fifth embodiment of the pedal according to the invention.

With reference initially to FIGS. 1 and 3, a racing bicycle pedal is generally indicated 1 and includes a body 2 of generally conventional shape carrying a lateral pin 3 for connection to one of the bicycle cranks.

A toe clip 4, also of conventional type, is fitted to the front of the body 2 and has an associated retaining strap 5.

As shown in FIG. 1, the pedal 1 is adapted to receive and clamp a cycling shoe S of conventional type, whose front part is inserted in the toe clip 4 and retained against the body 2 of the pedal 1 by means of the strap 5.

In order to ensure firm clamping, the shoe S has a conventional cleat T fitted to its sole and having a transverse recess G engaged by a rear transverse stop in the form of a plate 6 of the body 2 of the pedal 1.

Whilst the transverse stop 6 is, conventionally, fixed firmly and rigidly to the body 2, according to the invention this stop 6 is movable relative to the body 2 so as to enable the release of the cleat, in use, as a result of backwards force applied by the shoe S above a threshold value, in the manner explained below.

In the embodiment of FIGS. 1 to 3, the transverse member 6 has two lateral appendages 7 with respective apertures 8 traversed by a support shaft 9 fixed to the body 2 parallel to the transverse member 6.

As better shown in FIG. 2, each aperture 8 is generally L-shaped, with an upper inclined portion 8a and a lower portion 8b which is arranged horizontally with reference to the operative position of the pedal shown in FIG. 1.

Above the support shaft 9, the transverse stop 6 is connected to the body 2 by means of a preloaded resilient system which tends to keep the transverse member 6 in a forward raised position, in which the support shaft 9 engages the portions 8a of the apertures 4 in the two side flanges 7.

In the embodiment illustrated, this resilient system is constituted by two resilient members 10 interposed between the structure of the body 2 and an abutment 11 fixed to the transverse stop 6 by means of respective screws 12. These screws 12 enable the loading of the resilient members 10 to be varied in dependence on the cyclist's requirements and in particular, under normal running conditions, enable the situation in a conventional pedal to be reproduced, that is with the transverse stop 6 fixed relative to the body 2 in its position in which it is engaged in the recess G in the cleat T, with the support shaft 9 engaged in the portions 8b of the apertures 8.

The assembly of the transverse stop 6 described above enables the shoe S to be released immediately from the pedal 1 if need be, without the need to operate the strap 5 manually. In fact, in the event of an emergency, it is sufficient to jerk the foot sharply backwards with a backward force greater than the reaction of the resilient members 10. As a result of this action, the transverse stop 6 is moved backwards relative to the body 2, moving away from the body itself. The effect of this movement is to bring the portions 8a of the two apertures 8 into correspondence with the shaft 9, so as to enable the subsequent lowering of the transverse member 6 and create a clearance H between the shoe S and the strap 5. This condition is shown in FIG. 1.

The combination of the lowering of the transverse member 6 and the clearance between the shoe and the toe clip 4 enables the cleat T to be released from the transverse member 6 and hence the shoe S to be released from the pedal 1.

By virtue of the biasing force of the resilient members 10, after the jerk, the transverse member 6 returns automatically from its retracted, lowered position to its usual raised, forward position in which the cleat is clamped.

In the variant illustrated in FIG. 4, in which parts identical or similar to those described above are indicated by the same reference numerals, the fitting of the transverse stop 6 to the body 2 of the pedal 1 is achieved by means of a pair of linkages 13 instead of by the lateral flanges 7 with the apertures 8. The transverse member 6 is articulated to the shaft 9 by these linkages 13 so that it can perform the same backward and downward movements as described above as a result of a sharp backward movement of the user's foot.

FIGS. 5 to 9 show another embodiment of the pedal according to the invention, in which parts identical or similar to those described above are indicated by the same reference numerals.

In this embodiment, the transverse stop 6 is articulated about a horizontal axis X—X (with reference to the operative condition of the bicycle) to an auxiliary, plate-like body 14 which has threaded pins 15 for its assembly on end arms 16 provided at the rear of the pedal body 2.

The articulation of the transverse stop 6 is achieved by means of flanges 6b projecting from the plane of the transverse member and articulated to the horizontal shaft 9 which is supported at its ends by auxiliary flanges 14a integral with the auxiliary body 14.

The latter has a rectangular aperture 17 for the passage of a portion 6a of the transverse member 6 which is cantilevered in an L-shaped arrangement from the transverse member itself. The cantilevered portion 6a of the transverse member 6 has a straight groove 18 which is adapted to cooperate with an arm 19a of a pin spring 19 supported by a pair of pins 20 and 21 respectively, cantilevered from the auxiliary body 14. A second arm 19b of the pin spring 19 reacts against a L-shaped portion 22 of the auxiliary body 14. Moreover, the pin 21 supporting the spring 19 has an eccentric bush 21a which is rotatable relative to the pin. The eccentric bush 21a can be rotated, for example, by means of a screwdriver, from the back of the pedal.

A torsion spring 23 is mounted coaxially on the shaft 9 for rotating the transverse stop 6 and is arranged to urge the transverse member 6 towards the operative position illustrated in FIG. 5.

The assembly of the transverse stop 6 described above enables the shoe S to be released from the pedal 1 immediately, if need be, without the need to operate the strap 5 manually. In fact, in an emergency, it suffices to snap the pedal sharply backwards, with a backwards force greater than the force of the resilient snap-engagement of the arm 19a of the pin spring 19 with the groove 18 in the transverse member 6. As a result of this action, the transverse stop 6 pivots relative to the body 2, moving away from the body itself. This condition is shown in FIG. 6.

The combination of the downward pivoting of the transverse member 6 and the clearance between the shoe and the toe clip 4 enables the cleat T to be released from the transverse member 6 and thus enables the shoe S to be released from the pedal 1.

By virtue of the biasing force of the torsion spring 23, after the jerk, the transverse member 6 returns automatically to its operative position or, at least, to the position in which the cantilevered portion 6a is in contact with the pin spring 19. In this condition, it may be necessary to apply a further force to the transverse stop in order to snap the groove 18 resiliently back into correspondence with the arm 19a of the pin spring 19.

The magnitude of force needed to release the transverse stop 6 from its vertical operative position can generally be adjusted by means of the eccentric bush 21a whose rotation enables the distance between the arms 19a of the pin spring 19 and the flat cantilevered portion 6a of the transverse member 6 to be varied accurately, thus varying the compressive force with which the pin spring acts on the groove 18 of the cross member.

FIGS. 10 to 14 show a further embodiment of the pedal according to the invention in which parts identical or similar to those described above are indicated by the same reference numerals.

In this embodiment, as well as having a plate-like engagement portion indicated 6f, the transverse member 6 has a flat rear appendage 6g and a shaped flat front portion 6h. The transverse member 6 is articulated about an axis Y—Y (substantially vertical in the operative configuration of the pedal) to an intermediate element 25. The latter is in turn articulated about an axis X—X (substantially horizontal in the operative configuration of the pedal) to the body of the pedal 2 with the interposition of the auxiliary body 14.

Like the transverse member 6, the intermediate element 25 has a flat rear appendage 25a facing, and in contact with, the flat rear appendage 6g of the transverse member 6. Each appendage has a through hole, 6r and 25r, respectively in which an articulation pin 27 constituted, for example, by a bolt, is inserted.

The auxiliary body 14 is fixed by screws V to the ends of the arms 2a of the body 2 of the pedal and has a flat, bridge-like portion 14b which is substantially coplanar with the support surface of the body 2 of the pedal and is provided with an L-shaped notch 28 having a first arm 28a and a second arm 28b which is wider than the first. A substantially-vertical guide pin 29 (in the operative configuration of the pedal) whose function will be explained below is also cantilevered from the flat portion 14b of the auxiliary body 14.

The intermediate element 25 has two parallel arms 25d articulated, with the aid of a horizontal shaft 9 coaxial with the axis X-X, to corresponding arms 14a of the auxiliary body 14.

The intermediate element 25 also has a flange 25e which, when mounted on the pedal, faces a corresponding flange 6m of the transverse member 6. The flange 2r of the intermediate element 25 has a shaped hole 31 arranged coaxially, in the operative configuration illustrated in FIGS. 10 and 13, with a corresponding threaded through-hole 32 in the flange 6m of the transverse member 6. A pin 33 is inserted in the two holes and has a first end 33a which is inserted with clearance in the shaped hole 31 and a second, threaded end 33b screwed into the threaded through hole 32 in the flange 6m of the transverse member 6 and provided with a transverse slot (not illustrated) so that it can be rotated by a screwdriver.

The pin 33 also has an annular, disc-shaped shoulder 33c which, when the pedal is assembled, is arranged to abut a first end 34a of a helical compression spring 34 coaxial with the pin 33 and having a second end 34a in abutment with the flange 25e of the intermediate element 25.

The flat portion 6h of the transverse member 6 has a substantially L-shaped hole 35 whose width corresponds to that of the pin 29 fixed to the flat portion 14b of the auxiliary body 14. A guide pin 36 is also cantilevered from the portion 6h of the transverse member 6 and has a shank 36a, whose diameter corresponds substantially to the width of the first arm 28a of the L-shaped notch 28, and an enlarged head 36b.

When the pedal is in the operative configuration (FIGS. 10 and 13), the shank 36a of the guide pin 36 is inserted. in the first arm 28a of the notch 28 and the head 36b of the pin prevents the rotation of the transverse member 6, together with the element 25, about the horizontal axis X—X. In the same configuration, the guide pin 29 is situated in an end 35a of the L-shaped hole 35 in the flat portion 6h of the transverse member 6.

As a result of a rotation of the shoe S about a vertical axis, the recess G in the cleat T urges the transverse member 6 to rotate about the vertical axis Y—Y, which causes the guide pin 36 to slide in the notch 28 and the guide pin 29 to slide in the L-shaped hole 35. As soon as the guide pin 29 reaches an intermediate, corner portion 35b of the hole 35, the enlarged end 36b of the guide pin 36 is no longer retained by the notch 28, so that backwards movement of the shoe S causes the transverse member 6 and the intermediate element 25 to rotate about the horizontal axis X—X (in correspondence with the shaft 9), enabling the shoe S to be removed from the toe clip 4 (FIGS. 11 and 14). The rotation of the transverse member 6 is limited by an end 35c of the hole 35 which the guide pin 29, which is firmly fixed to the body of the pedal 2, abuts.

During the rotation of the transverse member 6 about the vertical axis Y—Y, the helical spring 34 is compressed between the annular abutment 33c of the horizontal pin 33 and the flange 25e of the intermediate element 25. In fact, during this rotation, the flanges 6m and 25e move towards each other and the respective through holes 32 and 31 move out of alignment (this misalignment is made possible by the clearance between the pin 33 and the hole 31). The transverse member 6 is thus able to rotate only if a predetermined force is exceeded, this force being regulable by means of the screwing or unscrewing of the pin 33 relative to the flange 6m, to vary the preloading of the spring 34.

After the transverse member 6 has been rotated about the horizontal axis X—X (rotation of the intermediate element 25 about the shaft 9) the engagement of the guide pin 29 with the end 35c of the hole 35 keeps the transverse member 6 in the released configuration shown in FIGS. 11 and 14. In order to reset the operative configuration, after the recess G of the cleat T of the shoe S has been re-engaged with the transverse member 6, the user only has to exert a forwards pressure with the shoe S to snap the transverse member 6 back into the operative position of FIGS. 10 and 13.

In the variant illustrated in FIG. 15 (in which the same reference numerals as in FIGS. 1–14 have been retained for identical or similar elements), the guide pin and the locking pin, that is the pin which prevents rotation about the horizontal axis before rotation about the vertical axis has taken place, are both cantilevered from the front flat portion 6h of the transverse member 6.

A guide pin 37 is cantilevered from the flat portion 6h parallel to the pin 36 with its shank 37a projecting towards the auxiliary body 14. The guide pin 37 is intended to cooperate with an L-shaped aperture 38 formed in the flat portion 14b of the auxiliary body 14.

In order to make the transverse member move automatically from the released configuration to the operative configuration, a torsion spring 39 is mounted coaxially on the shaft 9 and reacts against the intermediate element 25 and against the auxiliary body 14.

What is claimed is:

1. A pedal for racing bicycles, comprising a pedal body carrying a toe clip with a strap for retaining a cycling shoe at the front, a transverse stop in the form of a projecting plate movably mounted at the rear of said pedal for engagement in a recess formed in a cleat fitted to the sole of the cycling shoe, and adjustable resilient means engaging said transverse stop whereby said transverse top is movable relative to said pedal so as to enable its release from the cleat in use as a result of a force applied by the shoe above a threshold value to overcome said resilient means wherein an intermediate element is articulated to said pedal body about a main axis substantially parallel to said transverse stop, said transverse stop being connected to said pedal body with the interposition of said intermediate element and being rotatable relative thereto about an auxiliary axis substantially perpendicular to said main axis so as, in use, to allow said transverse stop to be release from the cleat as a result of a pivoting force applied by the shoe of a predetermined magnitude about a substantially vertical axis and subsequent backwards movement of the shoe itself.

2. A pedal according to claim 1, wherein guide means are provided between said transverse stop and said pedal body for allowing said transverse stop to pivot relative to said main axis as a result of a rotation of said transverse stop about said auxiliary axis caused by the pivoting of the shoe about a substantially vertical axis.

3. A pedal according to claim 2, wherein resilient means are interposed between said transverse stop and said intermediate element and arranged to urge said transverse top into its operative position and to oppose its pivoting.

4. A pedal according to claim 2, wherein said guide means comprise an L-shaped aperture formed in said transverse stop and a corresponding pin fixed to said pedal body.

5. A pedal according to claim 2, wherein said guide means comprise an L-shaped aperture in said pedal body and a corresponding pin fixed to said transverse stop.

6. A pedal according to claim 2, wherein said pedal body defines a shaped seat for cooperating with an auxiliary pin to prevent premature rotation of said transverse stop about said main axis.

7. A pedal according to claim 3, wherein said resilient means comprise a helical spring arranged to be compressed during the rotation of said transverse stop about said auxiliary axis.

8. A pedal according to claim 7, wherein said resilient means further include an auxiliary spring for urging said transverse stop to pivot about said main axis towards its operative position.

9. A pedal according to claim 7, wherein said helical spring defines an axis substantially parallel to said main axis and is compressed between corresponding abutment flanges projecting from said transverse stop and from said intermediate element.

10. A pedal according to claim wherein said abutment flanges support, coaxially with said helical spring, a pin having a threaded end for cooperating with a corresponding threaded hole defined in one of said abutment flanges and an annular portion against which bears one end of said spring, the rotation of said pin causing a variation in the preloading of said spring for adjusting the pivoting force of the shoe which is able to cause release of the cleat from the transverse stop.

* * * * *